United States Patent

[11] 3,574,420

| [72] | Inventor | Ladislao Waldmann<br>Pontela 2968, Buenos Aires, Argentina |
|---|---|---|
| [21] | Appl. No. | 846,175 |
| [22] | Filed | July 30, 1969 |
| [45] | Patented | Apr. 13, 1971 |

[54] DEVICE FOR SECURING HANDLES TO CLEANING ELEMENTS OR THE LIKE
1 Claim, 3 Drawing Figs.

[52] U.S. Cl. .................................................. 306/29,
287/124
[51] Int. Cl. .................................................. B25g 3/20
[50] Field of Search.......................................... 306/29;
287/124; 279/2

[56] References Cited
UNITED STATES PATENTS

| 805,481 | 11/1905 | Meyer ........................... | 306/29 |
| 1,892,904 | 1/1933 | Robinson et al. .............. | 279/2X |
| 1,959,008 | 5/1934 | Spaloss .......................... | 306/29 |
| 2,091,882 | 8/1937 | Robinson ....................... | 306/29UX |
| 2,204,508 | 6/1940 | Matthies ......................... | 279/2UX |
| 2,282,412 | 5/1942 | Wallace .......................... | 306/29X |
| 2,406,128 | 8/1946 | Billman .......................... | 279/2 |

*Primary Examiner*—Reinaldo P. Machado
*Assistant Examiner*—Andrew V. Kundrat
*Attorney*—Michael S. Striker ABSTRACT: A device for securing a handle to a cleaning element provided with a cavity in which a threaded stem having a tapering free end projects coaxially fixed from the handle and engages between inwardly bent free end portions of a pair of opposite flexible arms fixed at the other ends thereof to a nut threadingly connected to the stem so that the arms may be radially expanded in the region of the free end portions thereof during rotation of the stem and the nut relative to each other in one direction to thereby connect the handle to a cleaning element when said end portions during such rotation are located in a cavity of the cleaning element.

PATENTED APR 13 1971

3,574,420

INVENTOR.
LADISLAO GALDHANN

BY
Michael J. Steiler
Attorney

DEVICE FOR SECURING HANDLES TO CLEANING ELEMENTS OR THE LIKE

The present invention refers to a new, original and practical unit to fix handles to cleaning elements and the like, in swift and simple way, without the need to use tools of any kind and without any effort on the part of the user, since the union is made simply by rotating the handle, to thereby cause the end of the device inserted in the respective cavity of the cleaning element or similar, to expand radially and to press firmly against the lateral walls of said cavity, so that the handle remains perfectly fixed to the cleaning element, without recourse to other fixing means, and with the additional advantage that, in order to separate said handle from the element to which it has been adjusted, it is sufficient to rotate said handle in opposite sense to the previous movement, so that the portion precedingly expanded retracts again, which allows immediate separation.

From the constructive point of view, the unit object of the present invention is formed by a tubular body adapted to be connected to one end of the respective handle, from one of the ends of which protrudes a threaded stem ending in the form of a wedge (preferably conical, even though it may be pyramidical, hemispherical, or of any other suitable shape); said wedge is adapted to be inserted between inwardly bent ends of a pair of expansion members, the opposed ends of which are connected to a nut to be screwed on said threaded stem, so that by rotating the handle, the stem rotates and the wedge which forms its free end, upon inserting between the expansion members, causes separation of the latter, and if such separation occurs when they are lodged, for instance, inside the respective cavity of the handle of a cleaning element or the like, said expansion will assure a firm, secure and efficient fastening which in order to be achieved or freed, does not require the use of any tool, but simply, to rotate in one sense or the other, as the case may be, the handle which one desires to connect to the cleaning element or the like.

Obviously, this same arrangement may be used to fasten tubular elements, as for instance different pieces of tubular structures, thus obtaining couplings in which the joining means are practically invisible and which are connected without the use of tools, simply by rotating the elements to be joined, in the manner already explained.

The unit of this invention may be produced in the sizes, materials and shapes deemed as most convenient to the ends sought.

So that this invention may be clearly understood, and there should be no hindrances in carrying it out, it will be described in detail hereunder, making reference to the illustrating drawings attached, in which:

FIG. 3 is a lengthwise section of the mounting headpiece of the unit on the tip and a section of the nut member, showing clearly how the adjusting members act by expansion within the receptive cavity of the handle of a cleaning element or the like.

In all these figures, the same reference numbers point to the same or corresponding parts.

Figure 1:
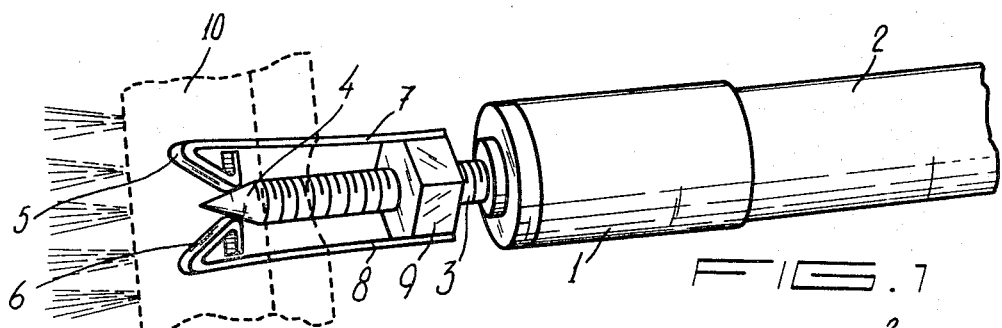
FIG. 1 is a perspective view of the unit object of this invention, in a possible way of achievement, in its operating state, i.e. with the expansion members separated due to the insertion between them, of the wedge-shaped end of the threaded stem.
Figure 2:
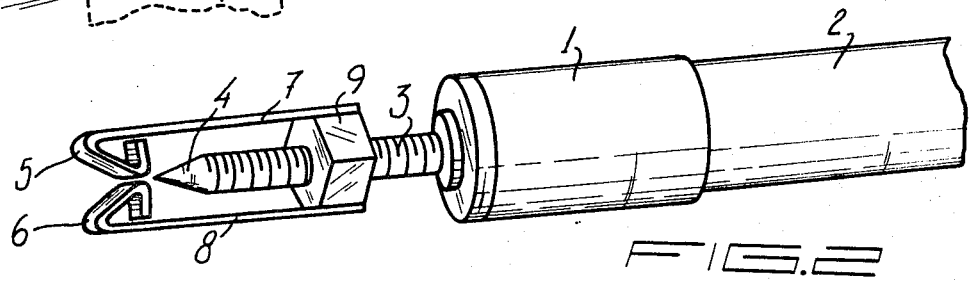
FIG. 2 shows the same unit as FIG. 1, but with the wedge of the free end of the threaded stem spaced from the expansion members.
Figure 3:
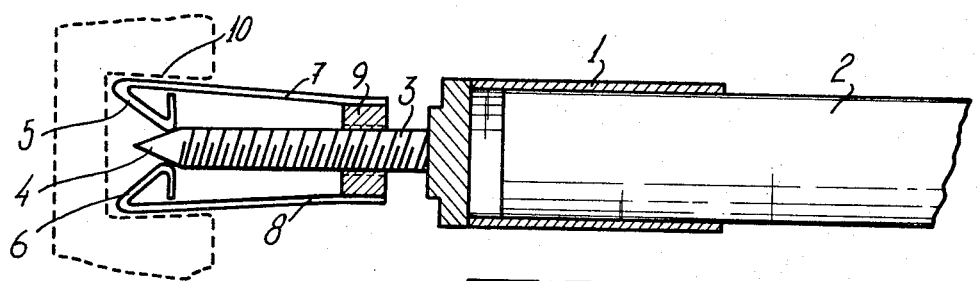

With reference to the illustrating drawings attached, the unit object of the present invention is formed by a tubular headpiece 1, open at one of its ends, through which is inserted the tip, handle or extension 2, while from the other end which is closed, a threaded elongated stem 3 axially projects, which ends in a wedge 4 (its apex being conical, pyramidal, hemispherical or similar) adapted to be inserted between at least a pair of expansion elements 5, 6, joined to one of the ends of as many elongated arms 7, 8, conveniently flexible, which at the opposite end are fixed to a nut 9, screwed on the stem 3, so that by rotating the headpiece 1 (or the tip or extension 2 attached thereto) the wedge element 4 is inserted between the expansion elements 5, 6, tending to move them apart, which will cause, if they are lodged, for instance, in the receptive cavity of a cleaning element 10, their tight abutment against the walls inside said cavity, thus obtaining a swift, secure and firm connection, without using any tools. For the separation, it is only necessary to rotate the tip or handle in the opposite sense to the one used to adjust it; when the wedge moves out of the expansion elements the pressure of the latter against the inner walls of the element joined to the tip, is released, and therefore it is easy to remove the unit.

It is understood that the present invention is not in any way limited to the example described and represented, but there may be introduced various alterations in shape and/or in detail, which will be comprised within the scopes of this invention, clearly determined in the claims attached to this specification.

I claim:

1. A device of the character described comprising a tubular member having a closed and an open end adapted to receive a handle; a threaded stem coaxially fixed to said closed end of said tubular member and having a tapering free end; a nut threadingly connected to said threaded stem; and a pair of resiliently flexible strip-shaped arms fixedly connected opposite each other at one of the ends thereof to said nut, said arms each extending forwardly from said connected ends substantially parallel to each other and having free end portions bent rearwardly and inwardly inclined toward each other into engagement with said tapering end of said stem and from the point of engagement bent radially outwardly away from each other and toward the parallel portion of its respective arm but terminating in spaced relationship thereto so as to form a substantially triangular portion with the end of each arm, whereby upon rotation of said stem relative to said nut said resilient arms will be radially expanded in the region of the free end portions thereof so that when said end portions are inserted in a cavity of a cleaning element the latter may be secured to the handle by such rotation.